A. Hallowell,
Tumbler Washer,
№ 52,565. Patented Feb. 13, 1866.
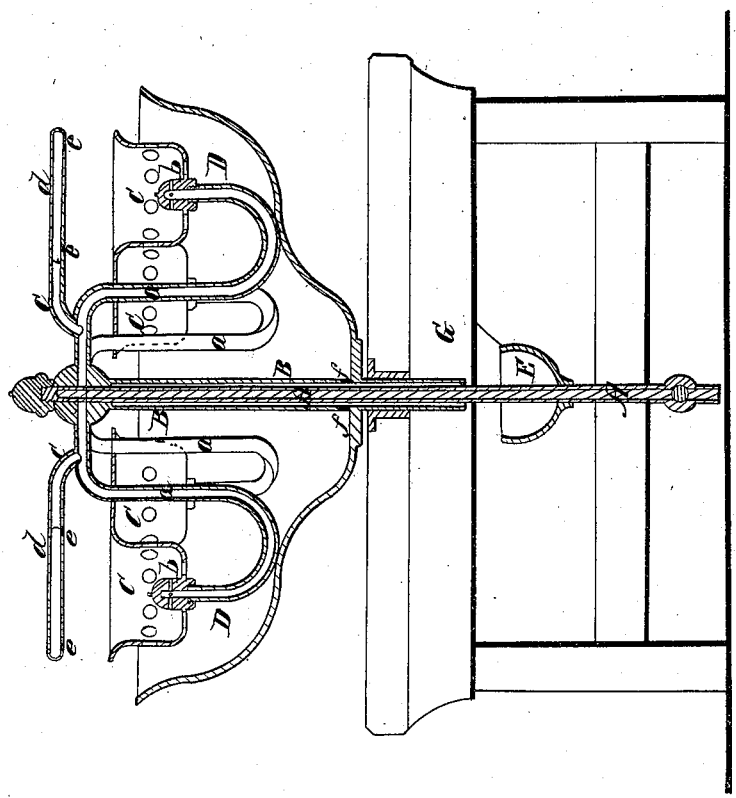
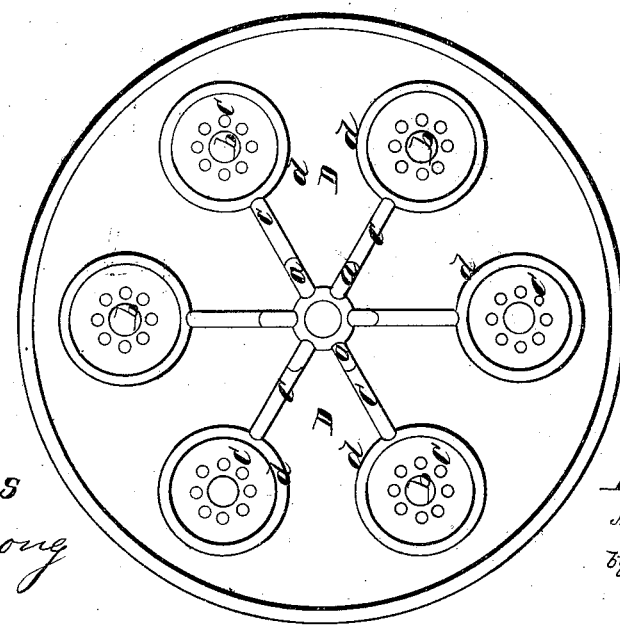

UNITED STATES PATENT OFFICE.

ALBERT HALLOWELL, OF LOWELL, MASSACHUSETTS, ASSIGNOR TO HIMSELF AND GEO. E. MITCHELL.

APPARATUS FOR WASHING TUMBLERS.

Specification forming part of Letters Patent No. 52,565, dated February 13, 1866.

*To all whom it may concern:*

Be it known that I, ALBERT HALLOWELL, of Lowell, in the county of Middlesex and State of Massachusetts, have invented a new and useful or Improved Tumbler-Washing Apparatus; and I do hereby declare the same to be fully described in the following specification and represented in the accompanying drawings, of which—

Figure 1 is a top view of it; Fig. 2, a vertical section of it.

In the said drawings, A denotes a vertical conduit or tube, arranged concentrically within another such tube, B, and closed at top, and there provided with a series of branch tubes, *a a a a*, leading from it and curved in manner as represented. Each of these branch tubes terminates in a jet or nose, *b*, having a series of holes, through which water, when introduced under pressure into the conduit A and forced therefrom through the branch tube, will be caused to flow in one or more streams. There is affixed to each branch pipe *a*, and with respect to the terminus thereof, as shown in the drawings, a cup, C, whose sides and bottom are perforated with holes.

Furthermore, leading from each branch tube *a* there is an auxiliary branch tube, *c*, which opens out of the tube *a* and into and supports a tubular jet-ring, *d*, arranged over the cup in manner as shown in Figs. 1 and 2. This jet-ring has a series of holes, *e e*, made in it for discharging streams of water against the external surface of a tumbler when placed, mouth downward, within the cup C of such ring.

Underneath the series of cups is a basin, D, which is fixed to the pipe B, such pipe being provided with one or more holes, *f*, made laterally through it, and at or near the bottom of the inner surface of the basin. Below the lower end of the pipe B there is a receiving-cup, E, which is fixed on the conduit A and revolves with it.

It is intended that when the said apparatus may be in use it shall be mounted in or on a suitable stand, G, or in or on the counter of a store or soda, mineral-water, or beer fountain, it being designed for washing the tumblers used by persons drinking thereat, and it may be revolved either by manual power or by mechanism suitably applied to it, the water for washing being let into the conduit A by a pipe properly connected therewith, so as to admit of the apparatus being revolved. A tumbler, on being placed bottom up in any of the cups, will be washed both on its interior and exterior surfaces, the water after having performed its office of washing the tumbler being caught by the bowl and led by the pipe B thereof into the cup E. From the said cup it may be discharged into a suitable spout or conduit for conveying it to a drain.

I do not claim the subject of the United States Patent No. 48,934, granted July 25, 1865, to Barney Hart—that is, I do not claim a foraminous shelf and one or more jet-pipes arranged for discharging water through the shelf and upon tumblers when placed thereon.

What I claim, and desire to secure by Letters Patent, is as follows:

1. One or more cups, E, jet-pipes, and tubular annuli *d*, arranged and combined together substantially in manner and so as to operate as and for the purpose specified.

2. The combination and arrangement of the basin D and its discharging-tube B with the conduit A, its branch pipes and cups, or the same and one or more tubular annuli, *d*, as specified.

3. The combination and arrangement of the receiving-cup E with the tubes A B, the basin D, and the branch pipes and cups on the same, and the annuli, as explained.

ALBERT HALLOWELL.

Witnesses:
WILLIAM H. ANDERSON,
ALBERT M. MOORE.